(12) United States Patent
Park (10) Patent No.: US 11,713,745 B2
(45) Date of Patent: Aug. 1, 2023

(54) HYDRAULIC ACCUMULATOR EXCHANGE TOOL

(71) Applicant: Siemens Gamesa Renewable Energy A/S, Brande (DK)

(72) Inventor: Heungsu Park, Lemming (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 311 days.

(21) Appl. No.: 17/049,118

(22) PCT Filed: Apr. 11, 2019

(86) PCT No.: PCT/EP2019/059261
§ 371 (c)(1),
(2) Date: Oct. 20, 2020

(87) PCT Pub. No.: WO2019/206662
PCT Pub. Date: Oct. 31, 2019

(65) Prior Publication Data
US 2021/0239093 A1    Aug. 5, 2021

(30) Foreign Application Priority Data
Apr. 26, 2018   (EP) ..................................... 18169411

(51) Int. Cl.
*F03D 7/02*      (2006.01)
*F03D 15/00*     (2016.01)
(Continued)

(52) U.S. Cl.
CPC ........... *F03D 7/0224* (2013.01); *F03D 15/00* (2016.05); *F03D 80/50* (2016.05); *F03D 80/70* (2016.05);
(Continued)

(58) Field of Classification Search
CPC . F03D 80/50; F05B 2230/80; F05B 2260/507
See application file for complete search history.

(56) References Cited

U.S. PATENT DOCUMENTS

2010/0011575 A1*   1/2010  Numajiri ................. B66C 17/04
                                                           29/889.1
2011/0280730 A1   11/2011  Numajiri
(Continued)

FOREIGN PATENT DOCUMENTS

CN       101558238 A       10/2009
CN       102171451 A        8/2011
(Continued)

OTHER PUBLICATIONS

International Search Report & Written Opinion for PCT/EP2019/059261 dated Jun. 28, 2019.

*Primary Examiner* — Sean Gugger
(74) *Attorney, Agent, or Firm* — Schmeiser, Olsen & Watts LLP (57) ABSTRACT

Provided is an arrangement for removing and/or exchanging a hydraulic fluid accumulator installed within a hub of a wind turbine, the arrangement including: a first pair of mounting legs each having at an upper portion connector for connecting to a hub component; a second pair of mounting legs each having at an upper portion connector for connecting to a hub component; a first bar connecting the first pair of mounting legs at a lower portion; a second bar connecting the second pair of mounting legs at a lower portion; an elongate resting structure for carrying an accumulator, the resting structure being at one end slidably supported by the first bar and at another end slidably supported by the second bar and being movable in a parallel manner traverse, in particular perpendicular, to a longitudinal direction the resting structure.

16 Claims, 7 Drawing Sheets

(51) Int. Cl.
*F03D 80/50* (2016.01)
*F03D 80/70* (2016.01)

(52) U.S. Cl.
CPC ..... *F05B 2230/80* (2013.01); *F05B 2260/507* (2013.01)

(56) References Cited

U.S. PATENT DOCUMENTS

2012/0125876 A1* 5/2012 Park ................. B66C 17/04
                                                    212/312
2015/0086369 A1   3/2015 Rohden

FOREIGN PATENT DOCUMENTS

| CN | 102439290 A | 5/2012 |
| CN | 103221685 A | 7/2013 |
| CN | 104379924 A | 2/2015 |
| CN | 106415001 A | 2/2017 |
| EP | 2 402 604 A2 | 1/2012 |
| WO | 2012/069062 A1 | 5/2012 |
| WO | 2015/090655 A1 | 6/2015 |

\* cited by examiner

HYDRAULIC ACCUMULATOR EXCHANGE TOOL

CROSS-REFERENCE TO RELATED APPLICATIONS

This application claims priority to PCT Application No. PCT/EP2019/059261, having a filing date of Apr. 11, 2019, which is based on EP Application No. 18169411.8, having a filing date of Apr. 26, 2018, the entire contents both of which are hereby incorporated by reference.

FIELD OF TECHNOLOGY

The following relates to an arrangement and to a method for exchanging a hydraulic fluid accumulator installed within a hub of a wind turbine and further relates to a hub hydraulic assembly and still further relates to a wind turbine including the hub hydraulic assembly.

BACKGROUND

A wind turbine may require a hydraulic system for actuating one or more components of the wind turbine, such as a yaw system, a pitch system or the like. Conventionally, an hydraulic fluid accumulator assembly has been installed within the hub of the wind turbine at which plural rotor blades are connected. The accumulator assembly installed within the hub is also referred to as hub hydraulic assembly (HHA). The accumulators may store hydraulic fluid, such as a mineral oil or water based liquid, and may be connected by several pipes or hoses carrying or conveying the hydraulic fluid, in particular the hydraulic fluid to one or more locations within the blades and/or the nacelle of the wind turbine.

The hydraulic fluid accumulators may be required to be exchanged from time to time, in order to ensure a safe operation. Conventionally it has been difficult to exchange an accumulator comprised in a hub hydraulic assembly due to hindered access to the accumulator and the restricted space available for maintenance personnel and/or also available for carrying away the old accumulator.

Thus, there may be a need for an arrangement and for a method for exchanging a hydraulic fluid accumulator installed within a hub of a wind turbine, wherein a safe and fast exchange is achieved and only requiring an auxiliary structure having simple construction and low weight.

SUMMARY

According to an embodiment of the present invention it is provided an arrangement for exchanging a hydraulic fluid accumulator installed within a hub of a wind turbine, the arrangement comprising: a first pair of mounting legs each having at an upper portion connection means or connector for connecting to a hub component; a second pair of mounting legs each having at an upper portion connection means or connector for connecting to a hub component; a first bar connecting the first pair of mounting legs at a lower portion; a second bar connecting the second pair of mounting legs at a lower portion; an elongate resting structure for carrying an accumulator, the resting structure being at one end slidably supported by the first bar and at another end slidably supported by the second bar and being movable in a parallel manner traverse, in particular perpendicular, to a longitudinal direction of the resting structure.

The arrangement may be assembled close to or within the nacelle of the wind turbine for which exchange of an accumulator is required. The arrangement may have a low weight such as several kilograms, for example 5 to 20 kg. The arrangement may be adapted for exchanging an accumulator which may have in particular a cylindrical shape, may have a weight between 50 kg and 150 kg and which may have a length of between 1 m and 3 m for example. The hydraulic fluid accumulator may be filled with hydraulic fluid (e.g. oil or water-based liquid) and may have one or more hydraulic connectors to which hydraulic pipes or hoses are connected which lead to components requiring hydraulic fluid supply.

At the hub, three or more rotor blades may be connected. The hub may be connected to a rotation shaft which may be connected to an optional gearbox which in turn may be connected to an electric generator.

The mounting legs may be utilized for mounting the arrangement at the hub component, which may in particular be or comprise a hydraulic or a hub hydraulic assembly (HHA) which may be installed within the hub. In particular, the HHA may have approximately a three-fold symmetry, wherein the symmetry axis may be aligned with or slightly inclined relative to the rotation axis of the hub. The hub hydraulic assembly may comprise three mounting plates which mutually include an angle of 120° each on which several, in particular five, accumulators are mounted. During normal operation, the hub hydraulic assembly rotates together with the hub and the rotor blades. The HHA may in particular supply hydraulic fluid for actuating a pitch system for pitching the blades.

The connection means or connector at the upper portion of the mounting legs may be configured in a number of manners, such as comprising a clamp, bolts or an engagement or clipping mechanism. The connection to the hub component may be performed by maintenance personnel or service personnel in an easy manner.

The first pair of the mounting legs may be arranged (when the arrangement is mounted at the hub component) to be oriented closer to the tip of the hub than the second pair of mounting legs.

The accumulator to be exchanged may be mounted at the mounting plate of the hub hydraulic assembly. Thereby, the mounting plate may be tilted relative to a horizontal direction or horizontal plane by for example 13°. The hub itself may be tilted by for example 6° together with the nacelle on the wind turbine tower. The arrangement may support a tilt of the accumulator to be exchanged in a range from for example 0° to 20°. Depending on the tilt, the length of the first pair of mounting legs and the second pair of mounting legs may be adapted. In particular, the larger the tilt is, the larger may be the difference between the length of the first pair of mounting legs and the second pair of mounting legs.

The first bar and the second bar may in particular run substantially perpendicular to an extension of the first pair of mounting legs and second pair of mounting legs. The first bar as well as the second bar may substantially be straight bars. All components of the arrangement may be manufactured from a metal, such as steel.

The elongate resting structure may be configured for carrying one (single) accumulator. The elongate resting structure may have in a cross-section a tray-like shape for accompanying the accumulator. The resting structure may substantially be oriented such that a longitudinal direction of the resting structure is substantially perpendicular to longitudinal directions of the first bar and the second bar. The resting structure may be shifted without changing its orientation in a parallel manner in a direction of the longitudinal direction of the first bar or the second bar. By placing the resting structure at different positions, accumulators mounted at an accumulator mounting plate at different positions may be exchanged in an easy manner.

The resting structure may have at or close to respective ends engagement portions which may engage with the first bar and the second bar, respectively, allowing shifting the resting structure in a parallel manner along the longitudinal direction of the first bar and the second bar.

The arrangement may be mounted at the hub component such that the resting structure is located in a distance between for example 25 cm and 2 m below the position where the accumulator to be exchanged is mounted at the accumulator mounting plate of the hub hydraulic assembly. Thereby, the accumulator to be exchanged may be required to be only lowered by a relatively short distance until the accumulator reaches the resting structure at which it can be placed and carried. Thus, a safe and reliable exchange, i.e. removal of an old accumulator and installation of a new accumulator is enabled by the arrangement.

According to an embodiment of the present invention, the arrangement is configured to temporarily fix the resting structure at one of plural positions along the first bar and the second bar, the plural positions matching plural positions of plural accumulators fixed in a hub hydraulic assembly.

Fixing the resting structure at one of plural positions may be achieved by different constructive measures. For example, one or more barriers may be provided which may be temporarily fixed at the first bar or the second bar to restrict the resting structure at a particular position. Further, one or more plungers of fixing pins may be provided. When the resting structure is enabled to be temporarily fixed at one of plural positions, advantageously, accumulators to be exchanged placed at different locations of a hub hydraulic assembly may easily be removed by shifting the resting structure to the position of the accumulator to be exchanged. Thereby, the accumulator to be exchanged may only be required to be lowered, i.e. moved in the vertical direction, to reach the resting structure without requiring moving the accumulator also in a direction lateral thereto, i.e. in the horizontal direction or plane. Thereby, removal and/or replacements of an accumulator may be facilitated.

According to an embodiment of the present invention, for temporarily fixing the resting structure the arrangement comprises at least one fixing pin, wherein at least one of the first beam and the second beam comprises plural holes, wherein a slide engagement portion of the resting structure comprises at least one through hole, wherein the at least one fixing pin is leadable through the through hole of the slide engagement portion and one of the plural through holes of the first and/or second beam for fixing the resting structure at one of the plural positions.

The fixing pin may be inserted into the holes by maintenance personnel. The plural holes in the first bar and/or the second bar may have a distance being equal to the distance of the different positions of the accumulators as mounted at the accumulator mounting plate. Thereby, different configurations of a hub hydraulic assembly may be supported.

According to an embodiment of the present invention, the arrangement is configured to, when mounted at the hub component, orient the elongate resting structure such as to carry the accumulator in the horizontal orientation.

When the accumulator is oriented in the horizontal plane when carried by the resting structure, the risk may be avoided that the accumulator slides away from or off the resting structure due to gravity. Thereby, a safe operation may be enabled.

According to an embodiment of the present invention, the first pair of mounting legs is longer than the second pair of mounting legs. Thereby, it may be enabled to support removing and/or replacing an accumulator from a hydraulic hub assembly in which the accumulators are mounted tilted relative to the horizontal plane. The higher the tilt of the mounted accumulators is, the longer the first pair of mounting legs is than the second pair of mounting legs.

According to an embodiment of the present invention, a first leg of the first pair and/or a first leg of the second pair: extends at a lower portion substantially perpendicular to a longitudinal direction of the first beam; has a kink in a middle portion; and extends beyond the kink to the upper portion tilted by between 5° and 15°, with respect to the extension direction in the lower portion.

The kink in the middle portion of the first leg of the first pair and/or the first leg of the second pair may be adapted to be compatible with the tilt of the stored accumulators. When the arrangement is mounted at the hub component, the lower portion may substantially extend in the vertical direction. When the upper portion of the first leg of the first pair and/or the first leg of the second pair is tilted by between 5° and 15°, an engagement portion may engage an accumulator mounting plate which may be tilted between 5° and 15° relative to the horizontal plane. Thus, conventionally applied configurations of a hub hydraulic assembly may be supported.

According to an embodiment of the present invention, the hub component is a hub hydraulic assembly comprising an accumulator mounting plate on which plural accumulators are fixed. The arrangement may exclusively be mounted at portions of the accumulator mounting plate without requiring mounting at still further components of the hub. Thus, the arrangement may be configured to be compatible with a particular hub hydraulic assembly, in particular accumulator mounting plate comprised therein. Thereby, great flexibility may be achieved, since the arrangement may not be required to be compatible with any other structures or components of the hub or within the hub.

According to an embodiment of the present invention, the connection means or connector at the upper portion of the first leg of the first pair and/or the first leg of the second pair comprises a clamp configured to engage the accumulator mounting plate.

The clamp may merely comprise engagement plates which may be spaced apart from each other such as to enclose therein a portion of the accumulator mounting plate. In other embodiments, the clamp may comprise pressing means or press which may allow to press two gripping surfaces towards each other to engage therein the mounting plate and hold it due to the pressing force. A clamp may be a conventional connection means or connector, thereby reducing the complexity of the arrangement.

According to an embodiment of the present invention, the clamp comprises two parallel plan gripping portions shiftable towards each other having the accumulator mounting plate in between. The plane gripping portions may be shiftable relative to each other and then fixable upon applying a pressure or pressing force to two opposed surfaces of the accumulator mounting plate. Thereby, a reliable fixation may be achieved.

According to an embodiment of the present invention, the connection means or connector at the upper portion of a second leg of the first pair and/or a second leg of the second pair comprises a bolt and/or a hole for a bolt. The bolts may be inserted and tightened by maintenance personnel. In contrast, the connection means or connector at the upper portion of the first leg of the first pair and/or the first leg of the second pair may not require tightening actions performed by maintenance personnel, thereby simplifying the installation of the arrangement within the hub.

According to an embodiment of the present invention, the resting structure is shorter than the accumulator and/or wherein the accumulator substantially has a cylindrical shape. When the resting structure is shorter than the accumulator, the accumulator may be lowered while carrying the accumulator close to its ends by strings or tires without colliding with the resting structure. When the accumulator has a cylindrical shape, it may safely be carried in the resting structure. Furthermore, conventionally available accumulators are thereby supported.

According to an embodiment of the present invention, the resting structure has a central resting portion arranged, when the arrangement is mounted at the hub component, in a horizontal plane and two portions adjacent to the central portion slanted in their width direction upwards.

Most of the weight of the accumulator may rest on the central resting portion, while the two portions adjacent to the central portion of the resting structure may ensure that the accumulator does not fall (or roll) off the resting structure.

According to an embodiment of the present invention, the arrangement further comprises an extension resting structure hookable at one end to the first beam to be in alignment with the resting structure and having at another end two floor legs to be put on a horizontal auxiliary structure floor, in particular of a maintenance frame or service platform.

The extension resting structure may allow to convey the accumulator to be exchanged further away, in particular towards a maintenance platform or service platform where the accumulator to be exchanged may be received from maintenance personnel. Thereupon, a new accumulator may be put onto the extension resting structure and may be shifted along the longitudinal direction of the extension resting structure to reach the resting structure from which it may be raised using strings or tires which may be put around ends of the accumulator.

According to an embodiment of the present invention it is provided a hub hydraulic assembly comprising an accumulator mounting plate and an arrangement according to one of the aforementioned or described embodiments. Furthermore, a wind turbine comprising the hub hydraulic assembly installed in a hub is provided.

It should be understood, that features, individually or in any combination, disclosed, described or mentioned in the context of an arrangement for exchanging a hydraulic fluid accumulator installed within a hub of a wind turbine may also apply, individually or in any combination, to a method of exchanging a hydraulic fluid accumulator installed within a hub of a wind turbine according to embodiments of the present invention and vice versa.

According to an embodiment of the present invention it is provided a method of exchanging a hydraulic fluid accumulator installed within a hub of a wind turbine, the method comprising: providing an arrangement for exchanging the hydraulic fluid accumulator, the arrangement having: a first bar connecting a first pair of mounting legs at a lower portion; a second bar connecting a second pair of mounting legs at a lower portion; connecting the first pair of mounting legs each having at an upper portion connection means or connector to a hub component; connecting the second pair of mounting legs each having at an upper portion connection means or connector to a hub component; moving an elongate resting structure at one end slidably supported by the first bar and at another end slidably supported by the second bar in a parallel manner traverse, in particular perpendicular, to a longitudinal direction of the resting structure such as to be below the accumulator to be exchanged; lowering the accumulator onto the resting structure for carrying the accumulator.

The aspects defined above and further aspects of embodiments of the present invention are apparent from the examples of the embodiments to be described hereinafter and are explained with reference to the examples of the embodiments. The following will be described in more detail hereinafter with reference to examples of embodiments but to which the invention is not limited.

BRIEF DESCRIPTION

Some of the embodiments will be described in detail, with reference to the following figures, wherein like designations denote like members, wherein.

DETAILED DESCRIPTION

Figure 1:
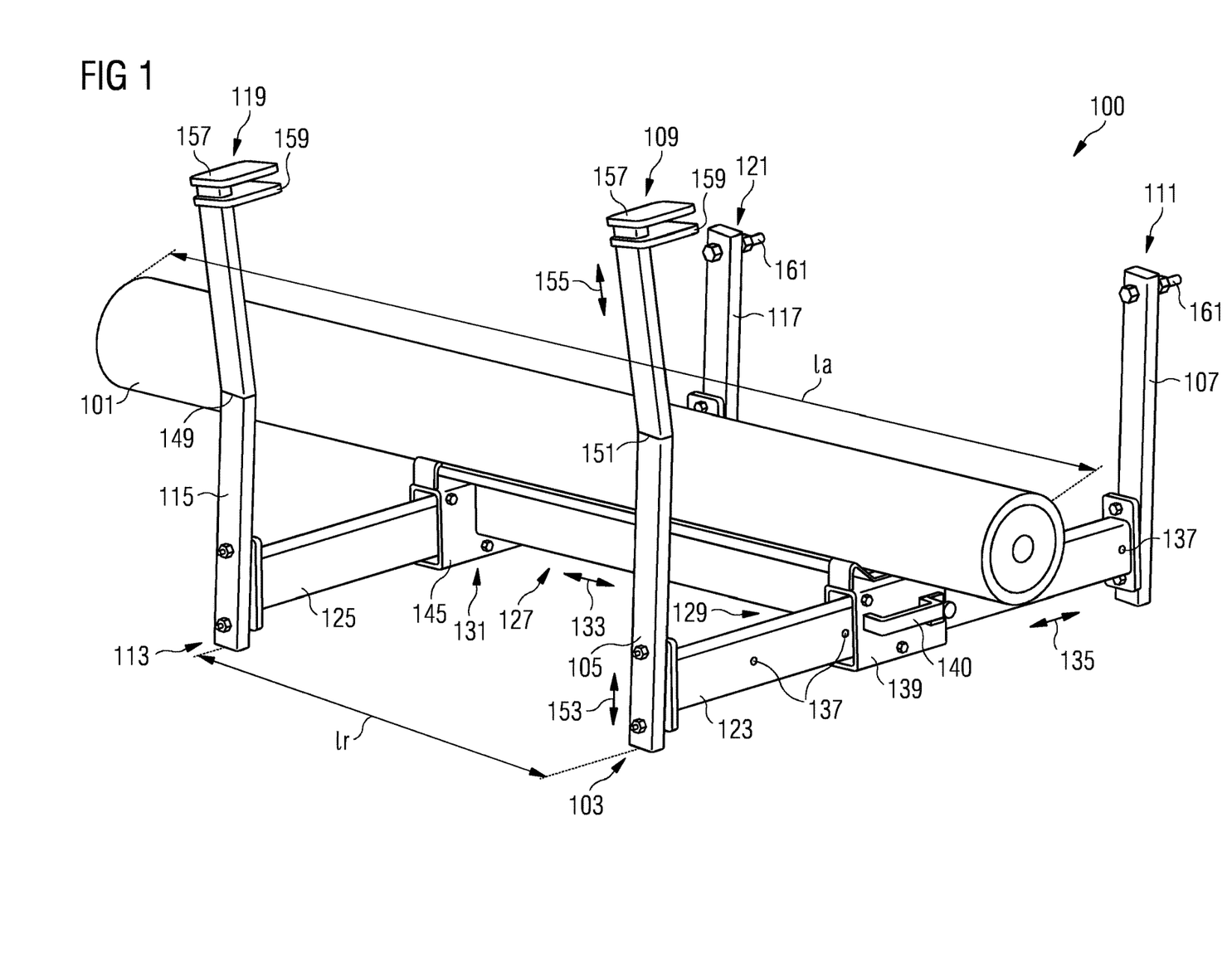
FIG. 1 schematically illustrates in a perspective view an arrangement for exchanging a hydraulic fluid accumulator including the accumulator according to an embodiment of the present invention.

The arrangement 100 for exchanging a hydraulic fluid accumulator 101 according to an embodiment of the present invention illustrated in FIG. 1 comprises a first pair of mounting legs 103 including a first leg 105 and a second leg 107 of the first pair 103. The first leg 105 and the second leg 107 of the first pair 103 each have at an upper portion connection means or connector 109, 111 respectively for connecting the respective legs to a hub component, i.e. a component inside a hub of a wind turbine. The arrangement 100 further comprises a second pair 113 of mounting legs including a first leg 115 and a second leg 117 of the second pair 113. Also the first leg 115 and the second leg 117 of the second pair 113 have at an upper portion connection means or connector 119, 121, respectively, for connecting the respective leg at an upper portion at a hub component.

The arrangement 100 further comprises a first bar 123 connecting the first pair 103 of mounting legs 105, 107 at a lower portion of the mounting legs. The arrangement further comprises a second bar 125 connecting the second pair 113 of mounting legs 115, 117 at a lower portion. In particular, the legs 105, 107, 115, 117 are connected to the first and second bar 123, 125, respectively, such that they substantially extend, at least at a lower portion thereof, traverse, in particular perpendicular to the first bar 123 and the second bar 125.

The arrangement 100 further comprises a resting structure 127 for carrying the accumulator 101. The resting structure 127 is at one end 129 slidably supported by the first bar 123 and is at another end 131 slidably connected by the second bar 125. This enables to move the resting structure 127 in a parallel manner, such that a longitudinal axis 133 of the resting structure 127 remains parallel to an original longitudinal direction, traverse, in particular perpendicular to the longitudinal direction 133 of the resting structure. The movement of the resting structure 127 is thereby enabled in directions 135 substantially being parallel to the longitudinal axis of the first bar 123 and the second bar 125.

The arrangement 100 is further configured to temporarily fix the resting structure 127 at one of plural positions along the first bar 123 and the second bar 125. For this purpose, the first bar 123 comprises plural holes 137 and also a slide engagement portion 139 of the resting structure comprises a through-hole which is best illustrated in FIG. 4 and labelled with reference sign 141. Thereby, the slide engagement portion 139 receives the first bar 123 within an opening 143 such that the sliding arrangement 139 can slide over or along the first bar 123. A similar sliding arrangement 145 is provided at the other end of the resting structure to surround or at least partly surround the second beam 125. The sliding arrangement 139 further comprises a fixing pin (or plunger) 147 which is leadable through the through-hole 141 of the slide engagement portion 139 and into or through one of the plural through-holes or holes 137 (see FIG. 2 or 3, e.g.) in the first bar or first beam 123 and/or the second beam 125 for fixing the resting structure 139 at one of the plural positions. The pin 147 and the holes 137 may be provided on both ends of the resting structure, i.e. at the slide engagement portion 139 as well as on the slide engagement portion 145 at the other end of the resting structure. A handle 140 at the side engagement portion 139 allows a user to shift the resting structure 127.

Figure 2:
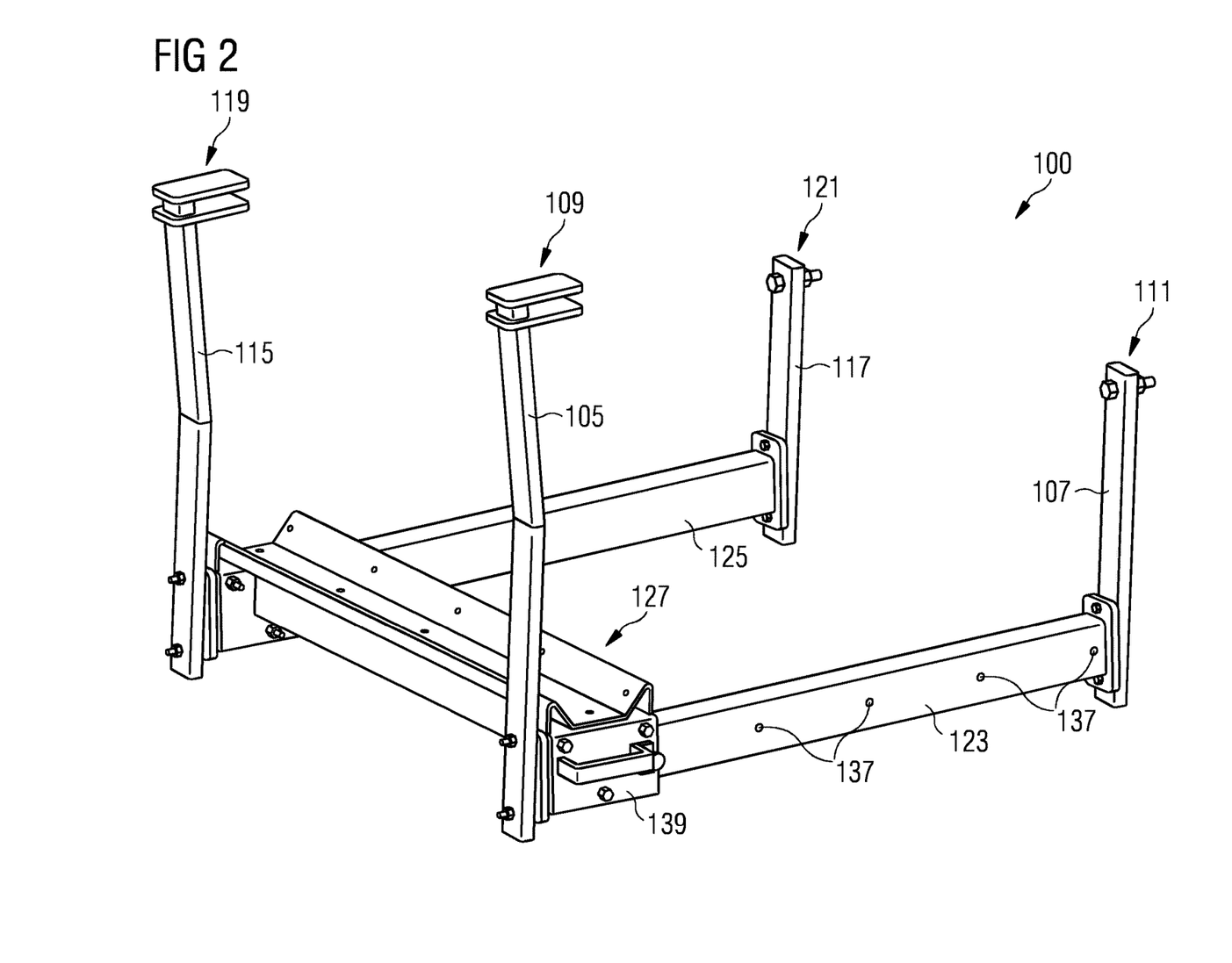
FIG. 2 schematically illustrates different configurations of an arrangement for exchanging an accumulator according to an embodiment of the present invention.
Figure 3:
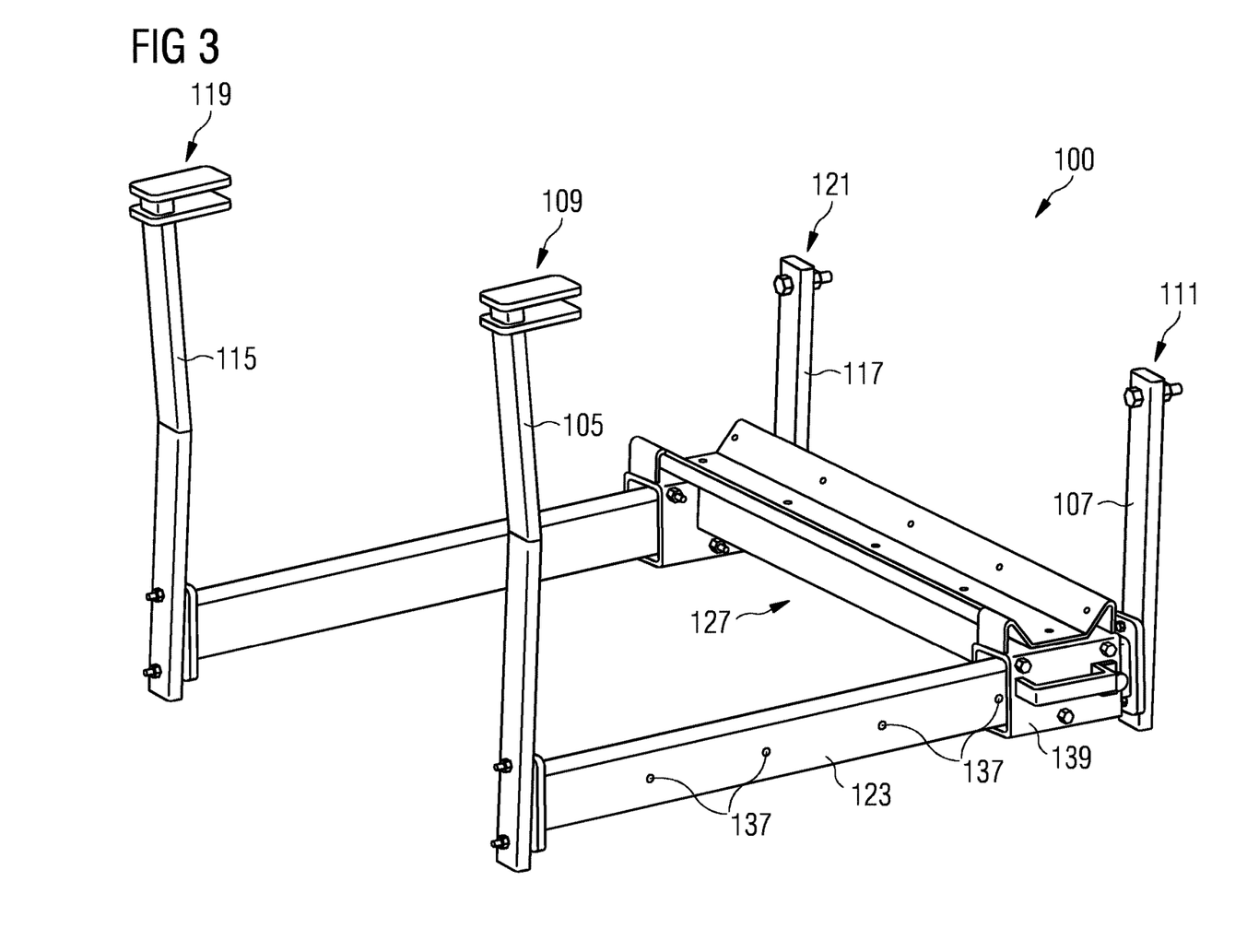
FIG. 3 schematically illustrates different configurations of an arrangement for exchanging an accumulator according to an embodiment of the present invention.
Figure 4:
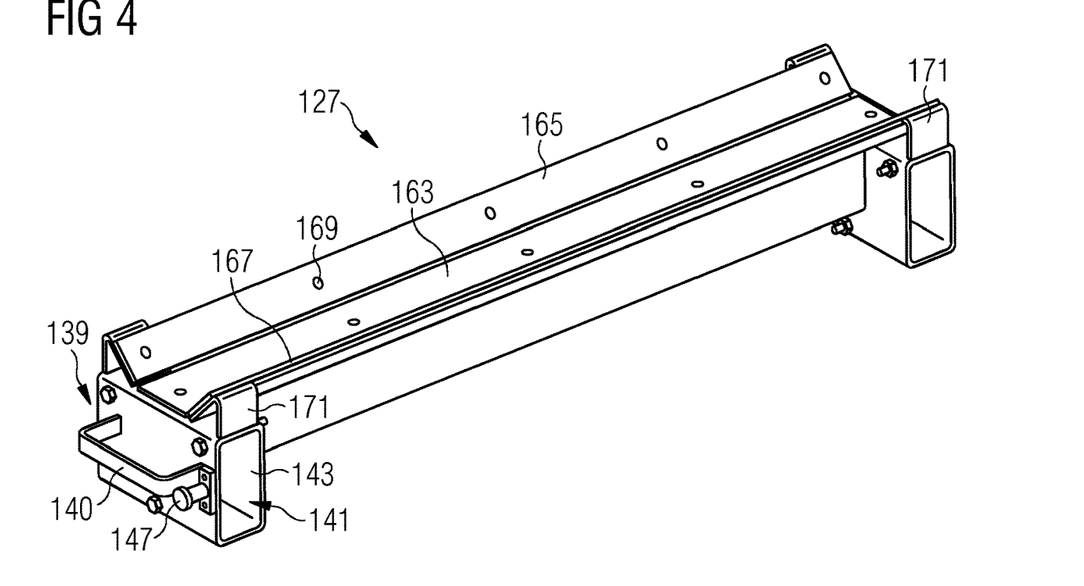
FIG. 4 schematically illustrates in a perspective view a resting structure included in embodiments according to embodiments of the present invention.

As can be appreciated from FIG. 1 or also from FIGS. 2 and 3, the first pair 103 of mounting legs 105, 107 is slightly longer than the second pair 113 of mounting legs 115, 117. In particular, the first leg 105 of the first pair 103 is longer than the first leg 115 of the second pair 113. Furthermore, the second leg 107 of the first pair 103 is longer than the second leg 117 of the second pair 113. This enables to orient the resting structure 127 to be in a horizontal plane, if the arrangement 100 is mounted at a hub component which is tilted relative to the horizontal plane.

As can also be appreciated from FIG. 1, the first leg 105 of the first pair and also the first leg 115 of the second pair 113 extend at a lower portion substantially perpendicular to a longitudinal direction 135 of the first beam 123 and also of a longitudinal direction of the second beam 125. Further, these legs 105, 115 have a respective kink 149, 151 at a middle portion thereof from which portion or from which kink 149, 151 upwards the respective upper portion of the respective leg is tilted by between 5° and 15° with respect to the extension direction 153 of the lower portion of the respective leg 105, 115, respectively. At the upper portion, the respective leg 105, 115 extends in the direction 155 inclined with respect to the extension direction 153 at the lower portion. The kinks enable to mount the upper portion of the respective leg 105, 115 using the mounting or connection means or connector 109, 119, respectively, in a simple manner, for example to an accumulator mounting plate of a hub hydraulic assembly as will be illustrated or described with respect to FIGS. 6 to 9.

The connection means or connector 119, 109 of the legs 115, 105, respectively, comprise a respective clamp configured to engage an accumulator mounting plate which may be present within the hub of the wind turbine. In particular, the clamps 119, 109 comprise two parallel plan gripping portions 157, 159 which may or may not be shiftable towards each other having the accumulator mounting plate in between. The clamps 119, 109 may comprise pressing means or press to press together the plan gripping portions 157, 159 or the gripping portion may have a predetermined distance from each other which may be fixed such that they can receive the accumulator mounting plate in between without applying pressure forces.

As can also be appreciated from FIG. 1, the connection means or connector 111, 121 at the upper portion of the second leg 107 of the first pair 103 and the second leg 117 of the second pair 113 comprises a bolt 161 and/or may comprise a hole for a bolt. Thereby, the upper portion of the second legs 107, 117 of the first pair 103 and the second pair 113 may merely be bolted to the hub component, in particular by leading the bolt 161 through a through-hole and fixing it with a nut.

As can also be appreciated from FIG. 1, the resting structure 127 is shorter than the accumulator having a length 'la', while the resting structure has a length 'lr'. Thereby, it is enabled to support the accumulator 101 during the exchange procedure at respective end portions of the accumulator by a string or a wire.

FIGS. 2 and 3 illustrate the arrangement 100 illustrated in FIG. 1 wherein the resting structure 127 is fixed at two different positions for exchanging accumulators mounted at different positions within the hub, in particular at different positions at an accumulator mounting plate of a hydraulic hub assembly. In particular, the resting structure 127 is shifted and fixed in FIG. 2 close to the lower portion of the first leg 105 of the first pair 103 and the first leg 115 of the second pair, while the resting structure is shifted and fixed close to the second leg 107 of the first pair 103 and close to the second leg 117 of the second pair 113. To fix the position of the resting structure, the pin 147 in the slide engagement portion 139 is inserted in one of the plural holes 137 in the first beam 123.

As can be seen in FIGS. 2, 3 and 4, the resting structure 127 has a central resting portion 163 which is, when the arrangement 100 is mounted at the hub component, in a horizontal plane. Further, the resting structure 127 has two portions 165, 167 adjacent to the central portion 163 and slanted in their width direction upwards, in order to avoid that an accumulator placed onto the resting structure 127 falls off the resting structure. The central resting portion 163 as well as the adjacent portions 165, 167 are fixed using bolts 169 to frame elements 171.

Figure 5:
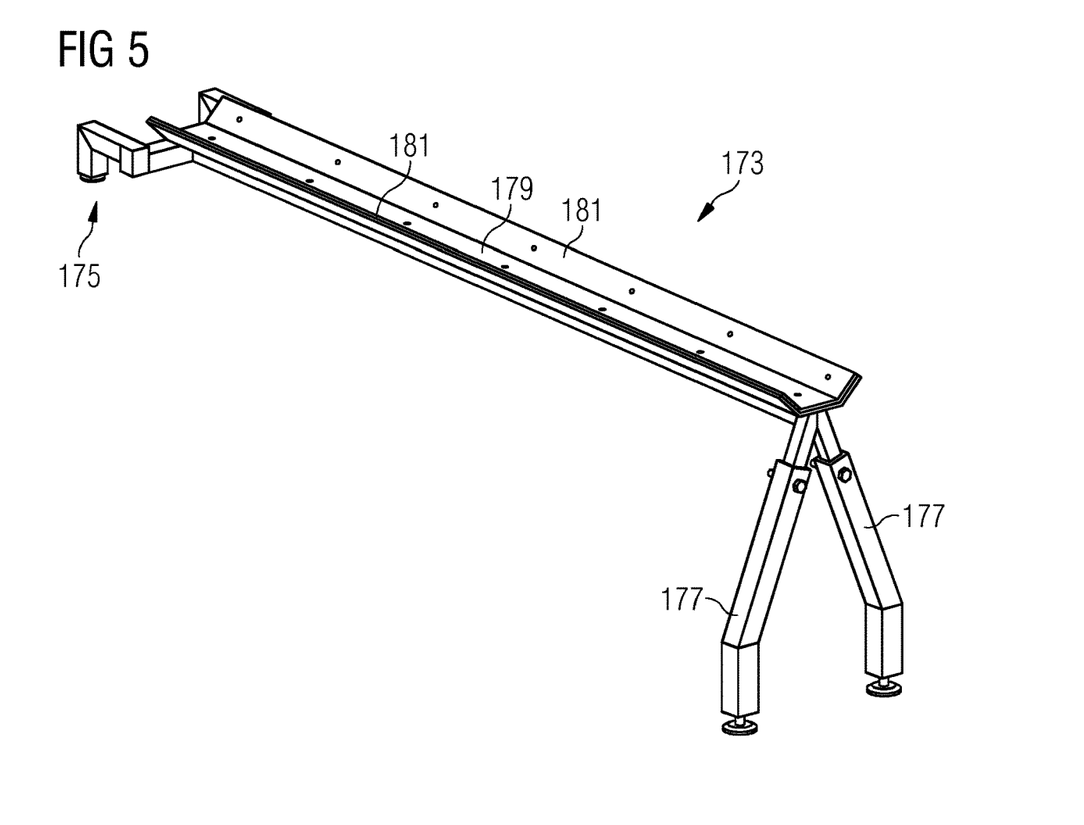
FIG. 5 schematically illustrates in a perspective view an extension resting structure included in an arrangement for exchanging an accumulator according to an embodiment of the present invention.

FIG. 5 illustrate in a perspective view an extension resting structure 173 which may be included in an arrangement for exchanging an accumulator according to an embodiment of the present invention. Thereby, the extension resting structure 173 may be utilized in combination with the arrangement parts illustrated in FIGS. 1 to 4.

In particular, the extension resting structure 173 comprises a hook portion 175 via which the extension resting structure is hookable at one end to the first beam 123 illustrated in FIG. 1 in particular substantially aligned with the resting structure 127. At another end, the extension resting structure 173 has two floor legs 177 to be put on a (e.g. horizontal) auxiliary structure floor. The extension resting structure 173 has a similar resting structure comprising a central resting portion 179 and two adjacent slanted portions 181 which together may carry an in particular cylindrical accumulator.

Figure 6:
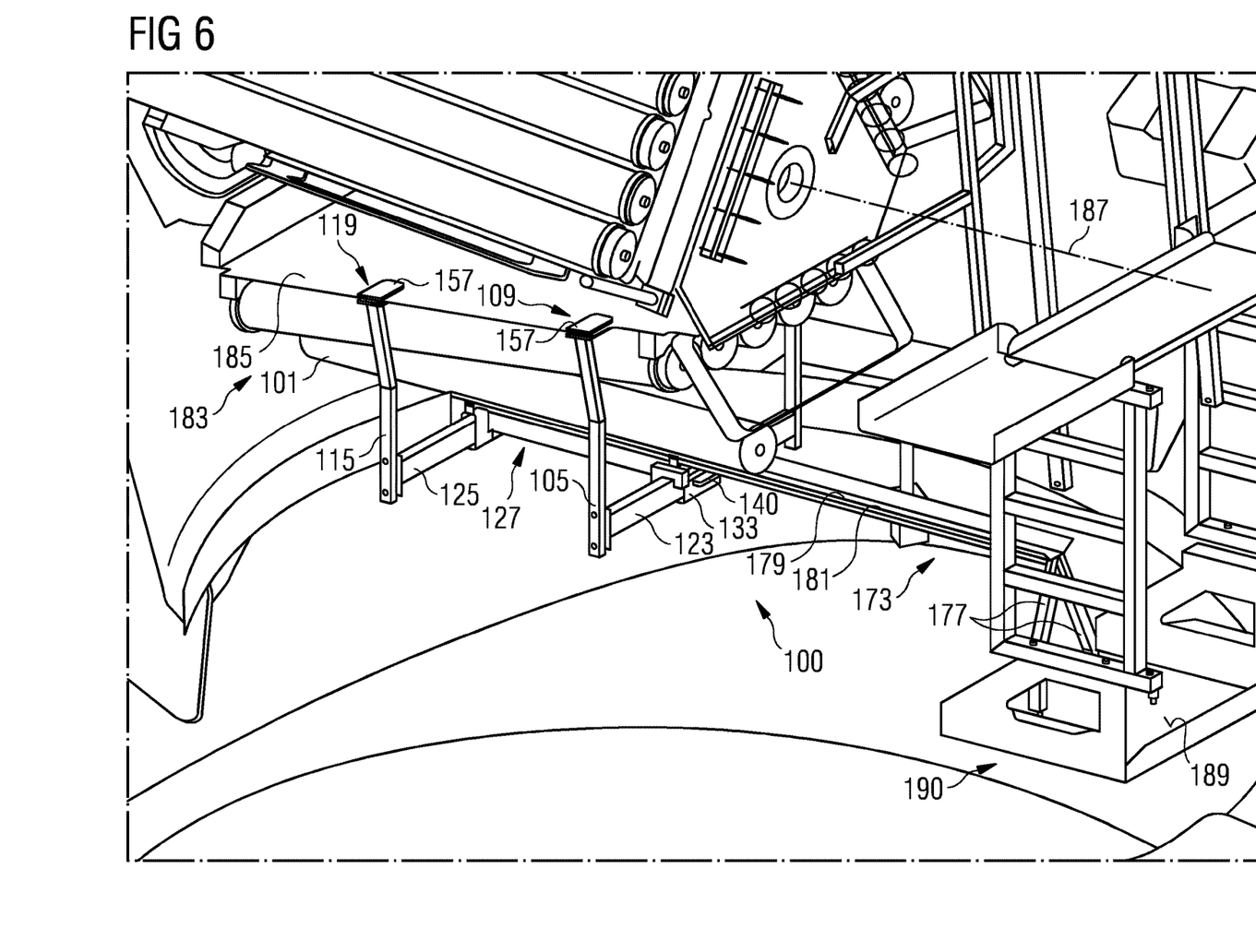
FIG. 6 illustrates an interior of a hub including an arrangement for exchange of an accumulator according to embodiments of the present invention.
Figure 7:
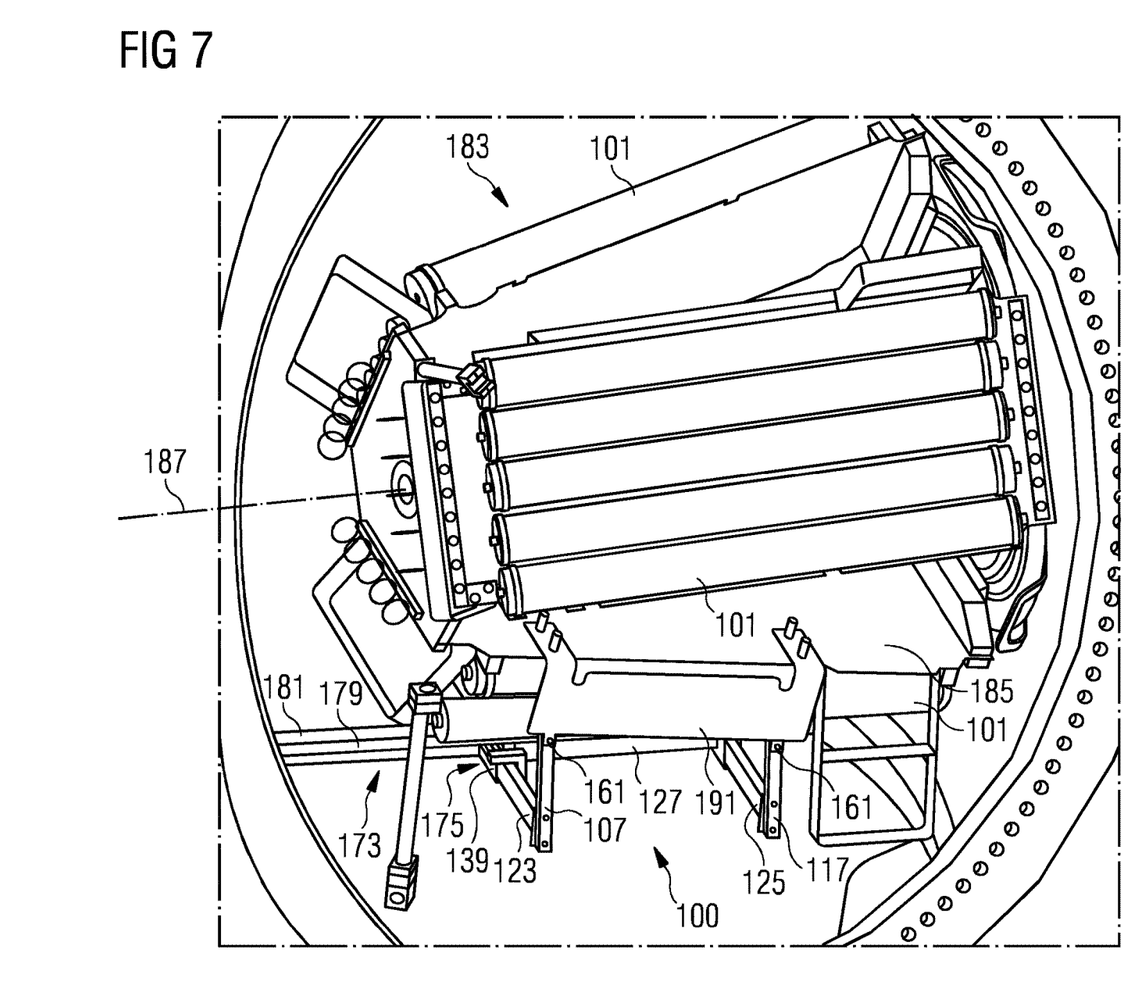
FIG. 7 illustrates an interior of a hub including an arrangement for exchange of an accumulator according to embodiments of the present invention.
Figure 8:
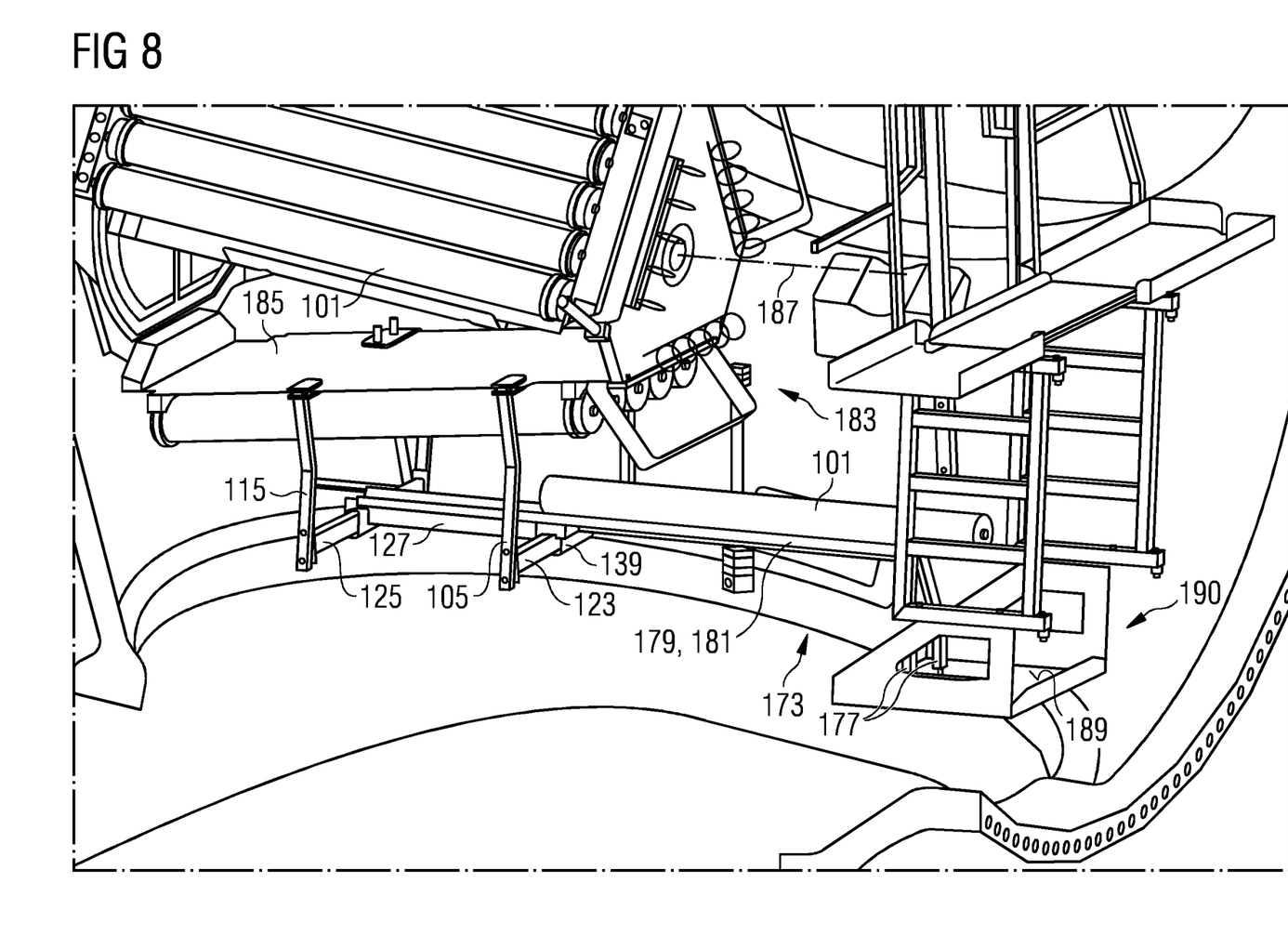
FIG. 8 illustrates an interior of a hub including an arrangement for exchange of an accumulator according to embodiments of the present invention.

FIGS. 6 to 8 illustrate an arrangement 100 for exchanging an accumulator according to an embodiment of the present invention when installed within a hub of the wind turbine during a removal/exchange procedure for removing/exchanging an accumulator. Within the hub, a hub hydraulic assembly 183 is installed. In the illustrated example the hub hydraulic assembly 183 comprises three accumulator mounting plates 185 which are oriented and installed such that they substantially form a triangle when viewed in cross-section or viewed along a direction of a rotation axis 187 of the hub and thus rotation axis of the rotor shaft. In particular, the hub hydraulic assembly 183 has at least approximately three-fold symmetry having the symmetry axis aligned with the rotation axis 187.

At each accumulator mounting plate 185, five cylindrical accumulators are installed and provide supply of hydraulic fluid during normal operation of the wind turbine during which they rotate together with the hub around the rotation axis 187. For exchanging one of the accumulators 101, the arrangement 100 for exchanging an accumulator has been installed within the hub by mounting it to one of the accumulator mounting plates 185, in particular the one which is oriented downwards. For connecting the arrangement 100 to the mounting plate 185, the connection means or connector 109, 119 engage a portion of the mounting plate 185 such that one of the gripping portions 157 is above and one of the gripping portions 159 is below the mounting plate.

While the arrangement 100 is mounted within the hub, the resting structure is oriented in the horizontal plane. It should be noted, that the horizontal plane is not necessarily parallel to the plane of the accumulator mounting plate 185, since at least one of the whole hub and the hub hydraulic assembly 183 may be tilted relative to the horizontal plane, such as between 5° and 15°. By having the different lengths of the legs of the first pair and the second pair, this tilt is balanced, such that advantageously the resting structure 127 is arranged and oriented within a horizontal plane, facilitating supporting an accumulator 101 to be exchanged.

In the illustrated exchange procedure, also the extension resting structure 173 has been hooked at one end to the first bar 123 to extend the conveying trail along which the accumulator to be removed/exchanged is to be transported. The two floor legs 177 of the extension resting structure are put on a horizontal auxiliary structure floor 189, such as a floor of a maintenance or service platform 190.

FIG. 7 illustrates a view inside the hub with the installed exchange arrangement 100 from the backward side having the second leg 107 of the first pair 107 and the second leg 117 of the second pair in the foreground. As can be seen in FIG. 7, the bolts 161 at the upper portion of the legs 107, 117 are connected to an additional plate 191 which is bolted to the accumulator mounting plate 185 approximately perpendicular to the plate 185.

FIGS. 6 and 7 illustrate a method step during removing one of the accumulators 101, as the accumulator has been lowered from the accumulator mounting plate 185 to the horizontally oriented resting structure 127. In a next step, as illustrated in FIG. 8, the accumulator 101 is shifted along the resting structure 127 to reach the extension resting structure 173 which extends towards the service platform at which the accumulator may be received by maintenance or service personnel. The removed accumulator 101 may then be replaced with a new accumulator which may be transported using the arrangement 100 and may be raised to the accumulator mounting plate and fixed thereon.

Accumulators may for example be mounted 13° tilted on a hub hydraulic assembly and the hub may in total be tilted 6° together with the nacelle on the turbine tower. The exchange tool or exchange arrangement may give the accumulator in a horizontal position when it is on the resting point. Two legs of the exchange tool may be attached to the hub hydraulic assembly frame without any additional joint tools and the other two legs may be fastened on the frame by two bolts so that the exchange tool may be stable under the hub hydraulic assembly frame. There may be two traversal beams between left legs and right legs which may give the accumulator a horizontal orientation. Between the two beams there may be a carriage (also called resting structure) which may hold the accumulator in a stable fashion. The carriage may move left to right to reach different storing positions of accumulators. The carriage may comprise a plunger (also called a fixing pin) which may stop the carriage in five or more positions right under the five accumulators as mounted at the accumulator mounting plate. The extension resting structure (also called gutter) may be attached to the bar on one side and two legs thereof may be put on a service platform. Since there may be cables and hoses for the hub hydraulic assembly, the pathway may be limited as is illustrated in FIGS. 6 to 8.

With the exchange arrangement, plural accumulators, such as five accumulators, may be extracted and transported using one pathway. The arrangement may provide safer accumulator exchange operations to technicians. Further, the exchange process using the exchange arrangement will be faster and easier for the service so that the whole turbine stop time may be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for at least one of removing and exchanging a hydraulic fluid accumulator installed within a hub of a wind turbine, the arrangement comprising:
   a first pair of mounting legs each having at an upper portion a connector for connecting to a hub component;
   a second pair of mounting legs each having at an upper portion a connector for connecting to the hub component and/or a further hub component;
   a first bar connecting the first pair of mounting legs at a lower portion of the first pair of mounting legs;
   a second bar connecting the second pair of mounting legs at a lower portion of the second pair of mounting legs;
   an elongate resting structure for carrying an accumulator, the resting structure being at one end slidably supported by the first bar and at another end slidably supported by the second bar and being movable in a parallel manner traverse to a longitudinal direction of the resting structure.

2. The arrangement according to claim 1, wherein the arrangement is configured to temporarily fix the resting structure at one of a plurality of positions along the first bar and the second bar, the plurality of positions respectively matching a plurality of positions of a plurality of accumulators fixed in a hub hydraulic assembly.

3. The arrangement according to claim 2,
wherein for temporarily fixing the resting structure the arrangement comprises at least one fixing pin,
wherein at least one of the first bar and the second bar comprises a plurality of holes along the bar,
wherein a slide engagement portion of the resting structure comprises at least one through hole,
wherein the at least one fixing pin is leadable through the through hole of the slide engagement portion and one of the plurality of holes of the first and second bar for fixing the resting structure at one of the plurality of positions along the first bar and the second bar.

4. The arrangement according to claim 1, wherein the arrangement is configured to, when mounted at the hub component, orient the elongate resting structure such as to carry the accumulator in the horizontal orientation.

5. The arrangement according to claim 1, wherein the first pair of mounting legs is longer than the second pair of mounting legs.

6. The arrangement according to claim 1, wherein a first leg of the first pair and a first leg of the second pair:
extends at a respective lower portion substantially perpendicular to a longitudinal direction of the first bar;
has a kink in a middle portion; and
extends beyond the kink to the upper portion tilted by between 5° and 15°, with respect to the extension direction in the lower portion.

7. The arrangement according to claim 2, wherein the hub component is a hub hydraulic assembly comprising an accumulator mounting plate on which the plurality of accumulators are fixed.

8. The arrangement according to claim 7, wherein the connector at the upper portion of the first leg of the first pair and the first leg of the second pair comprises:
a clamp configured to engage the accumulator mounting plate.

9. The arrangement according to claim 8, wherein the clamp comprises two parallel plan gripping portions shiftable towards each other having the accumulator mounting plate in between.

10. The arrangement according to claim 1,
wherein the connector at the upper portion of a second leg of the first pair and a second leg of the second pair comprises a bolt and a hole for a bolt.

11. The arrangement according to claim 1, wherein the resting structure is shorter than the accumulator and
wherein the accumulator substantially has a cylindrical shape.

12. The arrangement according to claim 1, wherein the resting structure has a central resting portion arranged, when the arrangement is mounted at the hub component, in a horizontal plane and two portions adjacent to the central portion slanted in their width direction upwards.

13. The arrangement according to claim 1, further comprising:
an extension resting structure hookable at one end to the first bar to be in alignment with the resting structure and having at another end two floor legs to be put on a horizontal auxiliary structure floor.

14. A hub hydraulic assembly, comprising:
an accumulator mounting plate; and
the arrangement according to claim 1 mountable at the accumulator mounting plate.

15. A method of removing and exchanging a hydraulic fluid accumulator installed within a hub of a wind turbine, the method comprising:
providing an arrangement for exchanging the hydraulic fluid accumulator, the arrangement having:
a first bar connecting a first pair of mounting legs at a lower portion of the first pair of mounting legs;
a second bar connecting a second pair of mounting legs at a lower portion of the second pair of mounting legs;
connecting the first pair of mounting legs each having at an upper portion a connector to a hub component;
connecting the second pair of mounting legs each having at an upper portion a connector to the hub component and/or to a further hub component;
moving an elongate resting structure at one end slidably supported by the first bar and at another end slidably supported by the second bar in a parallel manner traverse to a longitudinal direction of the resting structure such as to be below the accumulator to be exchanged;
lowering the accumulator onto the resting structure for carrying the accumulator.

16. An arrangement for at least one of removing and exchanging a hydraulic fluid accumulator installed within a hub of a wind turbine, the arrangement comprising:
a first pair of mounting legs each having at an upper portion a connector for operably connecting to a hub component;
a second pair of mounting legs each having at an upper portion a connector for operably connecting to the hub component;
a first bar connecting the first pair of mounting legs;
a second bar connecting the second pair of mounting legs;
an elongate resting structure for carrying an accumulator, the resting structure being at one end slidably supported by the first bar and at another end slidably supported by the second bar and being movable in a parallel manner traverse to a longitudinal direction of the resting structure.

* * * * *